United States Patent
Kim et al.

(10) Patent No.: US 11,965,106 B2
(45) Date of Patent: Apr. 23, 2024

(54) THERMAL INSULATING COATING WITH LOW THERMAL CONDUCTIVITY

(71) Applicant: Arkema Inc., King of Prussia, PA (US)

(72) Inventors: Kyu-Jun Kim, Cary, NC (US); Jeffrey P. Arendt, Cary, NC (US)

(73) Assignee: Arkema Inc., King of Prussia, PA (US)

( * ) Notice: Subject to any disclaimer, the term of this patent is extended or adjusted under 35 U.S.C. 154(b) by 507 days.

(21) Appl. No.: 16/605,892

(22) PCT Filed: Apr. 24, 2018

(86) PCT No.: PCT/US2018/029097
§ 371 (c)(1),
(2) Date: Oct. 17, 2019

(87) PCT Pub. No.: WO2018/200488
PCT Pub. Date: Nov. 1, 2018

(65) Prior Publication Data
US 2020/0239726 A1   Jul. 30, 2020

Related U.S. Application Data (60) Provisional application No. 62/490,046, filed on Apr. 26, 2017.

(51) Int. Cl.
  *C09D 151/08* (2006.01)
  *C09D 5/02* (2006.01)
(52) U.S. Cl.
  CPC .......... *C09D 151/08* (2013.01); *C09D 5/022* (2013.01)
(58) Field of Classification Search
  None
  See application file for complete search history.

(56) References Cited

U.S. PATENT DOCUMENTS

| | | |
|---|---|---|
| 4,291,135 A | 9/1981 | Hohlein et al. |
| 4,535,126 A | 8/1985 | Iida |
| | (Continued) | |

FOREIGN PATENT DOCUMENTS

| | | |
|---|---|---|
| CN | 1990799 A | 7/2007 |
| CN | 102746725 A | 10/2012 |
| | (Continued) | |

OTHER PUBLICATIONS

Machine translation of KR 1236584 B1, retrieved Nov. 2023 (Year: 2023).*

*Primary Examiner* — Nicole M. Buie-Hatcher
(74) *Attorney, Agent, or Firm* — Lynn B. Morreale (57) ABSTRACT

A dispersion of an alkyd-containing polymer dispersed in water is used to form a waterborne coating composition; the alkyd-containing polymer being an acrylic-modified alkyd polymer, a silicone-acrylic-modified alkyd polymer, or a mixture thereof. The resulting waterborne coating composition includes about 2 to about 30% by weight of one or more thermal insulating fillers with the remainder being the alkyd-containing dispersion, such that the coating composition contains about 30 to about 80% by weight of the water and about 2 to about 50% by weight of the alkyd-containing polymer. The coating applied therefrom exhibits at least one of the following properties: a thermal conductivity that is less than 100 mW/mK; a weight retention of at least 70% after being heated up to 400 C as measured by thermogravimetric analysis (TGA) with a heating rate of 20 C/min.; or a weight loss of less than 50% up to a temperature of 470 C as measured by the TGA.

8 Claims, 5 Drawing Sheets

(56) References Cited

U.S. PATENT DOCUMENTS

| | | | | |
|---|---|---|---|---|
| 4,692,481 | A | * | 9/1987 | Kelly ................. C09D 7/00 356/402 |
| 5,698,625 | A | * | 12/1997 | Billiani ............ C08G 63/48 524/513 |
| 2010/0166967 | A1 | * | 7/2010 | Fasano ............. C09D 5/028 524/556 |
| 2010/0174035 | A1 | | 7/2010 | Reidlinger et al. |
| 2012/0183789 | A1 | * | 7/2012 | Smith .............. C04B 41/009 428/447 |
| 2015/0175818 | A1 | * | 6/2015 | McInerney .......... C09D 5/32 428/335 |

FOREIGN PATENT DOCUMENTS

| | | | | | |
|---|---|---|---|---|---|
| CN | 103725124 | A | * | 4/2014 | |
| CN | 104610846 | A | | 5/2015 | |
| CN | 105199521 | A | | 12/2015 | |
| CN | 105400314 | A | * | 3/2016 | |
| JP | 51050945 | A2 | | 5/1976 | |
| JP | 2016044287 | A | | 4/2016 | |
| KR | 1236584 | B1 | * | 2/2013 | ............ C08K 3/22 |
| TW | 1494382 | B | | 8/2015 | |
| WO | WO 9844018 | A1 | | 10/1998 | |
| WO | WO-0073361 | A1 | * | 12/2000 | ........... C08F 273/00 |
| WO | WO 2015/077677 | A1 | | 5/2015 | |

* cited by examiner

THERMAL INSULATING COATING WITH LOW THERMAL CONDUCTIVITY

This application is a national stage application under 35 U.S.C. § 371 of PCT/US2018/029097 filed Apr. 24, 2018, which claims benefit to U.S. patent application Ser. No. 62/490,046, filed Apr. 26, 2017.

FIELD

This disclosure relates generally to a waterborne alkyd-containing thermal insulating composition that exhibits heat resistance and low thermal conductivity.

BACKGROUND

The statements in this section merely provide background information related to the present invention and may not constitute prior art.

Thermal insulating coatings are gaining significant interest due to general safety and energy conservation awareness in the coating industry. In an industrial plant, it is important to protect workers from serious burns when accidently exposed to a hot surface of a reaction kettle, storage tank, transfer pipe, and other heated equipment. In addition, heat dissipation during the transportation of a material through metallic pipes can contribute to a high level of an energy loss. In order to protect workers and reduce such energy loss, a thick layer of fiber glass and/or polyurethane foam may be applied to the heated metal surface. However, monitoring corrosion under the applied insulation is challenging and a separate moisture barrier often must be installed to preserve the integrity of metal surface. Therefore, liquid applied industrial coatings are becoming more popular because of their ability to slow down the corrosion process.

Most organic polymers employed in liquid applied industrial coatings have a thermal conductivity that is in the range of 140 to 160 mW/mK. These thermal conductivity values are not low enough to be a viable thermal insulating coating that meets most safety and energy conservation requirements. Therefore, in order to achieve a sufficient thermal insulating performance, commercial thermal insulating paints adopt a thermal insulating filler such as silica aerogel, hollow glass microspheres, and/or ceramic microspheres in which immobilized trapped air slows down heat transfer.

Silica aerogel can be effective as a thermal insulating filler because it exhibits a thermal conductivity in the range of 4 to 30 mW/mK. This level of thermal conductivity is due to a high content of immobilized air (>95%) being present within the silica particles because of their large surface area (~1600 $m^2/g$) and high porosity (>95%). However, silica aerogel is typically only useable in waterborne latex-based thermal insulating coatings However, commercial latex based thermal insulating paints exhibit a deficiency in service life-time when exposed to high temperatures. For example, a polymer formed by radical polymerization, such as polystyrene, polymethyl methacrylate, or a polyolefin, must be exposed to a temperature that is lower than 90° C. in order to achieve a 1000 day service time. In comparison, a polymer formed by condensation polymerization such as polyester can achieve a 1000 day service life when exposed to a higher use-temperature, i.e., up to 150° C.

Japanese Publication No. 2016044287A (2016) discloses an insulative coating used for electric wire prepared with a polyester-imide resin and inorganic microparticles whose surface is treated with a silicone oil.

Taiwan Patent No. 1494382B (2015) discloses the composition of an UV-resistant thermally insulating coating that comprises an inorganic solution, a water-soluble acrylic resin, and a silicone.

Chinese Publication No. 104610846A (2015) describes an UV-resistant thermally insulating coating prepared from ethyl orthosilicate, ethanol, deionized water, trimethyl-chlorosilane, 3aminopropylsilanetriol, butyl titanate, epoxy resin, butylamine, calcium carbonate, polypropylene glycol diglycidyl ether, and diethylaminopropylamine.

Chinese Publication No. 1990799A (2007) discloses a highly heat-resistant and thermal barrier coating composition that comprises heat-resistant resins, a solvent, a nanoscale porous filler, and a hollow micro-spherical inorganic filler.

International Publication No. WO 9844018A (1998) describes a solvent-based thermal insulated coating prepared by mixing a methyl phenyl polysilane with a bisphenol A epoxy resin and diethylenetriamine.

Japanese Publication No. 51050945A (1976) discloses heat-resistant stoving paints that are based on the reaction between 3,3',4,4' benzophenonetetracarboxylic anhydride and 4,4'diaminodiphenylmethane.

SUMMARY

The present invention generally provides a waterborne coating formulation for use in forming a heat resistant, thermal insulating coating. The coating formulation comprises, consists of, or consists essentially of about 2 to about 30% by weight of one or more thermal insulating fillers with the remainder being an alkyd-containing dispersion. The alkyd-containing dispersion comprises water and an alkyd polymer or an alkyd-containing polymer selected as one from the group consisting of an acrylic-modified alkyd polymer, a silicone-acrylic-modified alkyd polymer, and a mixture thereof. The coating formulation contains about 30 to about 80% by weight of the water and about 2 to about 50% by weight of the alkyd polymer or the alkyd-containing polymer. The thermal insulating filler may comprise a silica aerogel, hollow glass microspheres, hollow ceramic spheres, ceramic particles, or mixtures thereof. The coating formulation also contains volatile organic compounds (VOCs) in a quantity that is less than about 150 grams/liter as determined by ASTM D2369-10(2015)e1 test method.

The silicone-acrylic-modified alkyd polymer may include about 2 to about 50% by weight of a silicone compound, about 5 to about 60% by weight of an alkyd polymer, and about 3 to about 50% by weight of an acrylic polymer. The silicone compound may be a polysiloxane that contains one or more hydroxy-functional groups, one or more alkoxy-functional groups, or a mixture thereof. The alkyd polymer that may be used to form the silicone-acrylic-modified alkyd polymer may comprise 0 to 75 weight % of one or more fatty acids, 0 to 75 weight % of one or more oil, 10 to 40 weight % of a polyol with two or more hydroxyl functional groups, 10 to 40 weight % of an aromatic polyacid with two or more carboxylic acid groups, and 0 to 30% weight % of benzoic acid.

According to one aspect of the present disclosure, the alkyd-containing dispersion may be produced by the mechanical emulsification of an alkyd polymer or alkyd-containing polymer in water with up to 10 weight % of surfactant(s) based on the alkyd polymer or the alkyd-containing polymer. When desirable, the coating formulation may include an additional surfactants, ionic emulsifiers, or a mixture thereof.

According to another aspect of the present disclosure, the alkyd-containing dispersion may be produced by the salt formation between a basic compound and the carboxylic groups in the acrylic and/or alkyd polymer.

According to another aspect of the present disclosure, the coating formulation may also comprise, when desirable, a basic compound, such that a salt is formed between the basic compound and the carboxylic groups in acrylic and/or alkyd polymer. The basic compound may be selected as one from the group of ammonia, triethyl amine, n,n-dimethyl ethanol amine, trimethyl amine, n-methyl morpholine, and a mixture thereof.

When desirable, the coating formulation may further comprise one or more additives, including but not limited to additional polymers, pigments or colorants, fillers, coalescent agents, pH neutralizing agents, plasticizers, defoamers, thickeners, biocides, co-solvents, rheology modifiers, wetting or spreading agents, leveling agents, conductive additives, adhesion promoters, anti-blocking agents, anti-cratering agents or anti-crawling agents, antifreezing agents, corrosion inhibitors, anti-static agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellants, and stain resistant agents.

According to yet another aspect of the present disclosure, an alkyd-containing dispersion is provided for use in a waterborne coating composition. This alkyd-containing dispersion comprises, consists of, or consists essentially of water and an alkyd-containing polymer selected from the group of an acrylic-modified alkyd polymer, a silicone-acrylic-modified alkyd polymer, or a mixture thereof. The silicone-acrylic-modified alkyd polymer may comprise about 2 to about 50% by weight of a silicone compound, about 5 to about 60% by weight of an alkyd polymer, and about 3 to about 50% by weight of an acrylic polymer. The silicone compound may be a polysiloxane that contains one or more hydroxy-functional groups, one or more alkoxy-functional groups, or a mixture thereof.

According to yet another aspect of the present disclosure a coating layer is formed on a substrate by the application of the waterborne coating formulation described above and further defined herein. The substrate upon which the coating layer is formed comprises one selected from the group natural wood, fabricated wood, paper, cardboard, textiles, synthetic resins, plastics, ceramics, ferrous metals, non-ferrous metals, stone, concrete, and plaster. The coating layer exhibits at least one of the following properties: a thermal conductivity that is less than 100 mW/mK; a weight retention of at least 70% after being exposed to a temperature of 400° C. as measured by thermogravimetric analysis (TGA) with a heating rate of 20° C./min.; or a weight loss of less than 50% up to a temperature of 470° C. as measured by the TGA with a heating rate of 20° C./min.

The coating layer may comprise, consist of, or consist essentially of about 3 to about 95% by weight of one or more thermal insulating fillers; and about 5 to about 97% by weight of an alkyd polymer, an acrylic-modified alkyd polymer, a silicone-acrylic-modified alkyd polymer, or a mixture thereof. The coating layer may be uncured, partially cured, or substantially cured. The thermal insulating filler present in the coating layer is selected as one from a silica aerogel, hollow glass microsphere, hollow ceramic spheres, ceramic particles, and mixtures thereof.

The silicone-acrylic-modified alkyd polymer in the coating layer comprises about 2 to about 50% by weight of a silicone compound, about 5 to about 60% by weight of an alkyd polymer, and about 3 to about 50% by weight of an acrylic polymer. The silicone compound may be a polysiloxane that contains one or more hydroxy-functional groups, one or more alkoxy-functional groups, or a mixture thereof.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the alkyd-containing dispersion made and used according to the teachings contained herein is described throughout the present disclosure in conjunction with a waterborne coating composition in order to more fully illustrate the composition and the use thereof. The incorporation and use of such an alkyd-containing dispersion in other applications or as an uncured, partially cured, or substantially cured layer deposited onto the surface of a substrate, or the like are contemplated to be within the scope of the present disclosure. It should be understood that throughout the description, corresponding reference numerals indicate like or corresponding parts and features.

The present disclosure generally provides a waterborne alkyd-containing thermal insulating composition that contains one or more insulating fillers to lower thermal conductivity. The thermal insulating filler may include, but not be limited to, silica aerogel, hollow glass microsphere, hollow ceramic spheres, ceramic particles, and mixture thereof. Alternatively, the thermal insulating filler is silica aerogel. A ceramic may include, without limitation, an inorganic and non-metallic, oxide, nitride or carbide material such as borosilicate, silicone dioxide, clay, alumina, silicone carbide, and tungsten carbide. When desirable, the silicone-acrylic-modified alkyd dispersions may be used to prepare heat resistant coatings that either contains or does not contain thermal insulating fillers. As used herein, "Heat resistant coating" means a coating that retains at least 75% of its original weight when exposed to a temperature that reaches 400° C. in thermogravimetric analysis (TGA) with a heating rate of 20° C./minute. The thermal insulating coating of the present disclosure may be used for a variety of coatings and/or paint purposes. These coatings may be applied by any conventional means, such as for example, dipping, brushing, or spraying onto a variety of surfaces, which include, but are not limited to wood, fabricated wood, paper, cardboard, textiles, synthetic resins, ceramics, ferrous metals, non-ferrous metals, stone, concrete, plaster, and the like.

In addition, a composition and method for preparing silicone-acrylic-modified alkyd dispersions useful for preparing a thermal insulating composition are also provided. In this method, an alkyd polymer which is bound to a silicone moiety, reacts with either ethylenically unsaturated monomers or acrylic modified fatty acid(s).

An alkyd polymer or alkyd-containing polymer, which is produced by condensation polymerization, may withstand much higher temperatures than a polymer that is formed by radical polymerization. Due to the presence of a flexible and low molecular weight polymer chain and oxidative air-crosslinking capability after being applied onto a substrate, the alkyd polymer or alkyd-containing polymer of the present disclosure provides a useful coating that exhibits excellent adhesion to various substrates and defect-free film formation. Additionally, the alkyd polymer or alkyd-containing polymer of the present disclosure also provides an economical and easy synthetic route that further enhances the heat resistance exhibited by the thermal insulating coating through a chemical incorporation of silicone compound.

According to one aspect of the present disclosure, the composition of the thermal insulating coating comprises about 2 to about 30% by weight of thermal insulating fillers, about 30 to about 80% by weight of water and about 2 to about 50% by weight of an alkyd polymer and/or alkyd-containing polymer based on the overall weight of the thermal insulating coating composition. Alternatively, the thermal insulating coating composition comprises about 5 to about 25 wt. % thermal insulating fillers, about 40 to about 70 wt. % water, and about 10 to about 40 wt. % of an alkyd polymer and/or alkyd-containing polymer based on the overall weight of the thermal insulating coating composition. The thermal insulating coatings of the present disclosure exhibit significantly better heat stability than latex-based thermal insulating coatings as determined by the weight retention of the coating film when exposed up to a temperature of 400° C. and/or the temperature at which the coating film loses 50% of its original weight as determined by thermogravimetric analysis (TGA) done in air with a heating rate of 20° C./minute.

Surprisingly, a thermal insulating coating comprising the alkyd polymer or alkyd-containing polymer of the present disclosure exhibits better thermal insulating properties than a latex polymer-based thermal insulating coating. This result is quite unexpected since the mobile alkyd polymer chains in the aqueous medium, which have low molecular weight and are flexible, may have a higher tendency to penetrate into air-channels of silica aerogel, thereby, increasing thermal conductivity as compared to a latex polymer whose particle structure is stabilized by emulsifier(s). The surprisingly better thermal insulating property of the coating formed according to the teachings of the present disclosure confirms that a waterborne alkyd polymers or alkyd-containing polymers may act as a useful binder for forming a highly thermal insulating coating when formulated with a silica aerogel filler.

The alkyd polymer or alkyd-containing polymer comprises, consists of, or consists essentially of 0 to 75 weight % of one or more fatty acids, 0 to 75 weight % of one or more oil, 10 to 40 weight % of a polyol with two or more hydroxyl functional groups, 10 to 40 weight % of an aromatic polyacid with two or more carboxylic acid groups, and 0 to 30 weight % of benzoic acid. Alternatively, the alkyd polymer or alkyd-containing polymer comprises about 10 to 60 weight % of one or more fatty acids, 0 to 60 weight % of one or more oil, 10 to 30 weight % of a polyol with two or more hydroxyl functional groups, 10 to 35 weight % of an aromatic polyacid with two or more carboxylic acid groups, and 0 to 25 weight % of benzoic acid. Alternatively, the alkyd polymer or alkyd-containing polymer comprises about 20 to 60 weight % of one or more fatty acids, 0 to 50 weight % of one or more oil, 15 to 30 weight % of a polyol with two or more hydroxyl functional groups, 15 to 35 weight % of an aromatic polyacid with two or more carboxylic acid groups, and 0 to 25 weight % of benzoic acid.

Alternatively, the polyols comprise more than two hydroxyl functional groups and the aromatic polyacid comprises more than two carboxylic acid groups.

According to one aspect of the present disclosure, the alkyd polymer or alkyd-containing polymer may be present in the form of dispersions. Dispersions comprise small solid particles of the alkyd polymer or alkyd-containing polymer dispersed in a second phase, such as water. Since the solid particles are water insoluble, there must be a salt formation between the carboxylic groups in alkyd polymer or alkyd-containing polymer and basic compound to create a uniform and homogenous mixture. Alternatively, water-immiscible polymer becomes water-miscible through emulsification process afforded by surfactant(s) and shear mechanical energy.

According to another aspect of the present disclosure, the alkyd-containing polymer may be acrylic-modified alkyd dispersions, silicone-acrylic-modified alkyd dispersions, or mixture thereof.

The acrylic-modified alkyd dispersions of the present disclosure comprise 30 to 80 weight % of water, 20 to 70 weight % of acrylic modified alkyd polymer, and 0 to 10 weight % of basic compounds. Alternatively, the acrylic-modified alkyd dispersions of the present disclosure comprise 40 to 60 weight % of water, 40 to 60 weight % of acrylic modified alkyd polymer, and 0 to 10 weight % of basic compounds. Alternatively, the acrylic-modified alkyd dispersions of the present disclosure comprise 50 to 70 weight % of water, 30 to 50 weight % of acrylic modified alkyd polymer, and 0 to 10 weight % of basic compounds.

The acrylic-modified alkyd polymer may be prepared by the radical polymerization of ethylenically unsaturated monomers at the temperatures of about 50° C. to about 170° C. using a radical initiator in the presence of alkyd polymer produced with unsaturated fatty acid(s). Alternatively, acrylic-modified alkyd polymer may be prepared by reacting the hydroxyl functional alkyd polymer with acrylic-modified fatty acid(s) at the temperatures of about 150° C. to about 250° C. Several examples of acrylic-modified alkyd polymers include without limitation, Synaqua® 821-1377 (Arkema Inc., King of Prussia, PA), Synaqua® 821-2241 (Arkema Inc., King of Prussia, PA), and prototype EX80-801 (Arkema Inc., King of Prussia, PA).

The silicone-acrylic-modified alkyd dispersions of the present disclosure may comprise based on the overall weight of dispersion about 40 to about 85 weight % of water, about 2 to about 50 weight % of a silicone compound, about 5 to about 60 weight % of an alkyd polymer, and about 3 to 50 weight % of an acrylic polymer where the acrylic and/or methacrylic acid forms a salt with basic compound(s). Alternatively, the silicone-acrylic-modified alkyd dispersions comprise about 50 to about 75 wt. % water, about 5 to about 30 wt. % silicone compounds, about 10 to about 450 wt. % alkyd polymers, and about 5 to about 40 wt. % acrylic polymers. Alternatively, the silicone-acrylic silicone- and acrylic-modified alkyd dispersions comprise about 50 to about 75 wt. % water, about 10 to about 40 wt. % silicone compounds, about 20 to about 40 wt. % alkyd polymers, and about 10 to about 30 wt. % acrylic polymers.

The silicone compounds used for the preparation of the silicone-acrylic-modified alkyd dispersion may include, but not be limited to, polysiloxanes that contain one or more hydroxyl groups and/or alkoxy groups. Alternatively, the polysiloxanes comprise a plurality of hydroxyl groups, alkoxy groups, or a combination thereof. Several examples of silicone compounds include, but are not limited to hydroxyl and/or alkoxy group containing phenyl alkyl polysiloxanes, such as Silres SY 300 (Wacker Chemie AG, Germany) and Z 6018 (Dow Corning, Midland, MI).

The basic compound that may be incorporated into thermal insulating coating of the present disclosure may include, without limitation, ammonia, triethyl amine, n,n-dimethyl ethanol amine, trimethyl amine, n-methyl morpholine, sodium hydroxide, potassium hydroxide, lithium hydroxide and mixture thereof.

According to another aspect of the present disclosure, several methods for preparing silicone-acrylic-modified alkyd dispersions are provided. The silicone-acrylic-modified alkyd dispersions may be prepared by reacting silicone-modified alkyds with ethylenically unsaturated monomers in the presence of at least one radical generating initiator at a temperature between about 50° C. and about 170° C.

The silicone modified alkyds may be produced by reacting hydroxyl functional alkyds with a hydroxyl and/or alkoxy group containing polysiloxane at a temperature of about 60° C. to about 200° C. However, one of ordinary skill in the art will understand that the silicone-modified alkyd may also be produced by reacting hydroxyl and/or alkoxy group containing polysiloxanes with the reactants of an alkyd polymer, such as fatty acid(s), polyol(s), and polyacid(s) at a temperature between about 170° C. and 250° C.

Ethylenenically unsaturated monomers may include, but not limited to, methyl(meth)acrylate, ethyl (meth)acrylate, n-propyl (meth)acrylate, isopropyl (meth)acrylate, n-butyl (meth)acrylate, isobutyl (meth)acrylate, pentyl (meth)acrylate, 2-ethylhexyl (meth)acrylate, decyl(meth)acrylate, dodecyl (meth)acrylate, and stearyl (meth)acrylate, vinyl acetate, vinyl propionate, vinyl butyrate, vinyl valerate, vinyl 2-ethylhexylacrylate, vinyl isononanoate, vinyllaurate, vinyl stearate, vinyl versatate, alpha-methylstyrene, 2-chlorostyrene, 4-chlorostyrene, 2,5-dichlorostyrene and 4methoxystyrene. Alternatively, the monomers may be methyl (meth)acrylate, ethyl (meth)acrylate, n-propyl (meth)acrylate, isopropyl (meth)acrylate, n-butyl (meth) acrylate, isobutyl (meth)acrylate, pentyl (meth)acrylate, 2-ethylhexyl (meth)acrylate, alpha-methylstyrene, and styrene. Alternatively, the monomers are methyl methacrylate, n-butyl acrylate, isobutyl methacrylate, 2-ethyl hexyl acrylate, and styrene. Alternatively, vinyl or (meth) acrylate monomers include, but are not limited to, methacrylic acid, isobutyl methacrylate, 2-ethyl hexyl acrylate, vinyl toluene, isobornyl (meth)acrylate, stearyl methacrylate, acetoacetoxy ethylmethacrylate, diacetone acrylamide and styrene.

The initiators may include, without limitation, 2,2-azobisisobutyronitrile, 1,1-azobiscyclohexane carbonitrile, t-butyl peroxy benzoate, t-butyl peroctoate, di-t-amyl peroxide, di-t-butyl peroxide, t-butyl peroxybenzoate, and benzoyl peroxide.

When desirable, organic solvents may be added in the preparation of the silicone-acrylic-modified alkyd dispersion. These organic solvents may include, but are not limited to, n-butoxy ethanol, n-butoxy diethylene glycol, n-propoxy propanol, n-butoxy propanol, n-methoxy diethylene glycol, n-methoxy dipropylene glycol, npropoxy dipropylene glycol, and n-butoxy dipropylene glycol.

Alternatively, the silicone-acrylic-modified alkyd dispersions may also be produced by the reaction of the silicone-modified alkyds with the acrylic polymer-modified fatty acid(s) at a temperature in the range of about 150° C. to about 250° C.

The acrylic modified fatty acid(s) comprise about 20 to about 80 wt. % acrylic polymer and about 20 to about 80% by weight of fatty acid(s). The acrylic-modified fatty acid(s) may be prepared by the radical polymerization of ethylenenically unsaturated monomers in the temperature range of about 100° C. to about 200° C. using at least one radical initiator in the presence of unsaturated fatty acid(s). Examples of fatty acids include, but are not limited to, linoleic acid, tall oil fatty acid, sunflower fatty acid, linseed oil fatty acid, tung oil fatty acid, safflower fatty acid, lineloic acid and dehydrated castor oil fatty acid. Examples of initiators include, but are not limited to, 2,2-azobisisobutyronitrile, 1,1 azobiscyclohexane carbonitrile, t-butyl peroxy benzoate, t-butyl peroctoate, di-t-amyl peroxide, di-t-butyl peroxide, t-butyl peroxybenzoate, and benzoyl peroxide.

An alkyd dispersion may also be produced by mechanical emulsification of alkyd polymer or alkyd-containing polymer in water with up to about 10 weight % of surfactant(s) based on the weight of the alkyd or alkyd-containing polymer. The surfactants may include, but not be limited to, anionic, cationic, and nonionic emulsifiers including mixtures of different emulsifiers, such as at least one anionic emulsifier in combination with one or more nonionic emulsifiers. Representative anionic emulsifiers may include alkyl aryl sulfonates, alkali metal alkyl sulfates, the sulfonated alkyl esters, and fatty acid soaps. Several specific examples may include, without limitation, sodium dodecylbenzene sulfonate, sodium butyl naphthalene sulfonate, sodium lauryl sulfate, disodium dodecyl diphenyl ether disulfonate, N-octadecyl disodium sulfosuccinate and dioctyl sodium sulfosuccinate.

Several examples of surfactants or dispersants may include, without limitation, any known nonionic surfactants, such as ammonium, alkali metal, alkaline earth metal, and lower alkyl quaternary ammonium salts of sulfosuccinates, higher fatty alcohol sulfates, aryl sulfonates, alkyl sulfonates, alkylaryl sulfonates and/or ionic surfactants, such as alkylphenoxy polyethoxyethanols or ethylene oxide derivatives of long chain carboxylic acids, as well as polyacid dispersants, such as polyacrylic acid or polymethacrylic acid or salts thereof, and hydrophobic co-polymeric dispersants, such as co-polymers of acrylic acid, methacrylic acid, or maleic acid with hydrophobic monomers.

Alternatively, the surfactants may be selected as one or more from the group of tert-octylphenoxyethylpoly(39)-ethoxyethanol, dodecyloxypoly(10)ethoxy-ethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20) ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene (20)lauramide, N lauryl-N-polyoxyethylene(3)amine and poly(10)ethylene glycol dodecyl thioether. Examples of suitable ionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, palmitic acid, palmitoleic acid, stearic acid, oleic acid, linoleic acid, linolenic acid, mixtures of fatty acids (e.g., linseed oil fatty acid), sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium α-olefin (C14 C16)sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate, and a mixture thereof.

When desirable, the alkyd- or alkyd-containing polymers used in the alkyd dispersions may also comprise about 15 to about 75 wt. % of one or more fatty acids; about 5 to about 30 wt. % of a polyol with two or more hydroxyl functional groups; and about 5 to about 25 wt. % of an aromatic polyacid with two or more carboxylic acid groups. Alternatively, the alkyd polymer or alkyd-containing polymer comprises about 20 to about 65 wt. % of one or more fatty acids; about 10 to about 25 wt. % of a polyol with two or more hydroxyl functional groups; and about 10 to about 20 wt. % of an aromatic polyacid with two or more carboxylic acid groups. Alternatively, the alkyd polymer or alkyd-containing polymer comprises about 20 to 60 weight % of one or more fatty acids, 0 to 50 weight % of one or more oil, 15 to 30 weight % of a polyol with two or more hydroxyl functional groups, 15 to 35 weight % of an aromatic polyacid with two or more carboxylic acid groups, and 0 to 25 weight % of benzoic acid.

The fatty acids used for the preparation of alkyd- or alkyd-containing polymers may include, but are not limited to, dehydrated castor oil fatty acid, soybean oil fatty acid, tall oil fatty acid, sunflower fatty acid, coconut fatty acid, castor oil fatty acid, linseed oil fatty acid, tung oil fatty acid, safflower fatty acid, lineloic acid, and mixture thereof.

The oils used for the preparation of alkyd polymer include, but are not limited to, dehydrated castor oil, soybean oil, tall oil, sunflower oil, coconut oil, castor oil, linseed oil, tung oil, safflower oil, and mixture thereof.

The polyol compounds with two or more hydroxyl functional groups include, but are not limited to, trimethyol propane, mono-pentaerythritol, di-pentaerythritol, trim-ethyol ethane, ethylene glycol, diethylene glycol, di-propylene glycol, sorbitol, 2-methyl1,3-propane diol, neopentyl glycol, 2,2,4trimethyl pentanediol, propylene glycol, hydrogenated bisphenol A, 1,4-butanediol, 1,6-hexanediol, dimethyol propionic acid, and mixture thereof.

The aromatic polyacid with two or more carboxylic acid groups include, but are not limited to, phthalic anhydride, isophthalic acid, terephthalic acid, trimellitic anhydride, pyromelltic anhydride, 5-(sodiosulfo)-isophthalic acid, 1,4-cyclohexyl dicarboxylic acid, adipic acid, maleic anhydride, tetrahydrophthalic anhydride, hexahydrophthalic anhydride, succinic anhydride, succinic acid, and mixture thereof.

Additional components may be added in the preparation of the alkyd polymer without exceeding the scope of the present disclosure. Several examples of additional components may include, but not be limited to, organic solvents, such as methyl amyl ketone and xylene. Any organic solvents that remain in the final product at the end of the synthesis process may be removed, using means known to one skilled in the art, such as vacuum distillation, or by heating the product at a temperature that is higher than the boiling point of the solvent, or by using a combination of both.

The waterborne coating compositions may further comprise, consist of, or consist essentially of one or more additional polymers, as well as any other known or desired additives. The additional polymers may include, but not be limited to, a polymer or copolymer that is derived from one or more of (meth)acrylate, vinyl aromatic, ethylenically unsaturated aliphatic, or vinyl ester monomers, as well as various combinations thereof. The other additives, may comprise without limitation, any type of pigments or colorants, fillers, coalescent agents, pH neutralizing agents, plasticizers, defoamers, thickeners, biocides, co-solvents, rheology modifiers, wetting or spreading agents, leveling agents, conductive additives, adhesion promoters, anti-blocking agents, anti-cratering agents or anti-crawling agents, anti-freezing agents, corrosion inhibitors, anti-static agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellants, or stain resistant agents, as well as mixtures and combinations thereof. The selection of additives incorporated into a coating composition is determined based on a variety of factors, including the nature of the alkyd polymer or alkyd-containing polymer dispersion or emulsion and the intended use of the coating composition, to name a few.

Several examples of pigments and colorants include, without limitation, metal oxides, such as titanium dioxide, zinc oxide, or iron oxide, as well as organic dyes, or combinations thereof. Examples of fillers may include, but not be limited to, calcium carbonate, nepheline syenite, feldspar, diatomaceous earth, talc, aluminosilicates, silica, alumina, clay, kaolin, mica, pyrophyllite, perlite, baryte, or Wollastonite, and combinations thereof.

Several examples of co-solvents and plasticizers include ethylene glycol, propylene glycol, diethylene glycol, and combinations thereof, among others. Typical coalescents, which aid in film formation during drying, include but are not limited to, ethylene glycol monomethyl ether, ethylene glycol monobutyl ether, ethylene glycol monoethyl ether acetate, ethylene glycol monobutyl ether acetate, diethylene glycol monobutyl ether, and diethylene glycol monoethyl ether acetate, as well as combinations thereof.

Several examples of the thickening agents may include, without limitation, hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof.

The incorporation of various defoamers, such as, for example, polydimethylsiloxanes (PDMS) or polyether-modified polysiloxanes, may be done to minimize frothing during mixing and/or application of the coating composition. Suitable biocides can be incorporated to inhibit the growth of bacteria and other microbes in the coating composition during storage.

Coatings, which may include, without limitation, paints, adhesives, sealants, caulks, and inks, formed from the dispersion described herein, as well as methods of forming these coatings are believed to be within the scope of the present disclosure. Generally, coatings are formed by applying a coating formulation described herein to a surface, and allowing the coating to dry to form the coating or film. The resulting dried coatings typically comprise, at minimum, a plurality of layered polymer particles. The coating formulations and/or the dried coatings can further comprise one or more additional polymers and/or additives as described above or known to one skilled in the art. The coating thickness can vary depending upon the application of the coating. The thickness of the coating may be any thickness desirable for use in a particular application; alternatively, the range for the dry thickness of the coating is between about 0.025 mm (1 mil) to about 2.5 mm (100 mils).

The dispersion and the coatings formed therefrom can be applied to a variety of different surfaces including, but not limited to metal, asphalt, concrete, stone, ceramic, wood, plastic, polymer, polyurethane foam, glass, and combinations thereof. The coatings can be applied to the interior or exterior surfaces of a commercial product or manufactured good or item. When desirable, the surface may be an architectural surface, such as a roof, a wall, a floor, or a combination thereof. The latex compositions may be applied using any available method, including, without limitation, rolling, brushing, flow coating, dip coating, or spray coating, including but not limited to air spray, air-assisted spray, airless spray, high volume-low pressure (HVLP) spray, and air-assisted airless spray.

A method of forming a silicone-acrylic-modified alkyd dispersion may comprise, consist of, or consist essentially of adding an alkyd polymer to the reaction vessel; adding a silicone compound having one or more hydroxyl groups, alkoxy groups, or a combination thereof to the reaction vessel to form a silicone-modified alkyd polymer; adding acrylic monomers and radical initiator(s) to the reaction vessel; forming a silicone-acrylic-modified alkyd polymer; and forming a dispersion in the water with basic compound(s). Alternatively, a method of forming a silicone-acrylic-modified alkyd dispersion may comprise, consist of, or consist essentially of adding an alkyd polymer to the reaction vessel; adding a silicone compound having one or more hydroxyl groups, alkoxy groups, or a combination thereof to the reaction vessel to form a silicone-modified alkyd polymer; adding acrylic modified fatty acid(s); forming silicone-acrylic modified alkyd; and forming a dispersion in the water with basic compound(s). Optionally, when low dispersion viscosity is desired, hydrophobic diisocyanate, such as DESMODUR® W (Covestro, Pittsburgh, PA) may react with silicone-acrylic modified alkyd after forming a dispersion in the water.

The silicone-acrylic-modified alkyd polymer comprises 2 to 50% by weight of the silicone compound, 5 to 60% by weight of the alkyd polymer, and 3 to 50% by weight of the acrylic polymer.

The method may further comprise the radical polymerization of ethylenically unsaturated monomers using at least one radical initiator in the presence of the silicone-modified alkyd polymer at a temperature in the range of 50° C. to 170° C. or the reaction of the silicone-modified alkyd polymer with fatty acid functionality associated with the acrylic polymer at a temperature in the range of 150° C. to 250° C.

Other aspects of the present disclosure include:

1. A waterborne coating formulation for use in forming a heat resistant, thermal insulating coating, the coating formulation comprising about 2 to about 30% by weight of one or more thermal insulating fillers with the remainder being an alkyd-containing dispersion, the alkyd-containing dispersion comprising water and an alkyd polymer or an alkyd-containing polymer selected as one from the group consisting of an acrylic-modified alkyd polymer, a silicone-acrylic-modified alkyd polymer, and a mixture thereof, such that the coating formulation contains about 30 to about 80% by weight of the water and about 2 to about 50% by weight of the alkyd-containing polymer.

2. The coating formulation according to claim 1, wherein the thermal insulating filler is selected as one from the group consisting of silica aerogel, hollow glass microsphere, hollow ceramic spheres, ceramic particles, and mixtures thereof;

wherein the coating formulation contains volatile organic compounds (VOCs) in a quantity that is less than 150 grams/liter as determined by ASTM D2369-10(2015)e1 test method.

3. The coating formulation according to any of claim 1 or 2, wherein the silicone-acrylic-modified alkyd polymer comprises about 2 to about 50% by weight of a silicone compound, about 5 to about 60% by weight of an alkyd polymer, and about 3 to about 50% by weight of an acrylic polymer.

wherein the silicone compound is a polysiloxane that contains one or more hydroxy-functional groups, alkoxy-functional groups, or a mixture thereof.

4. The coating formulation according to claim 3, wherein the coating formulation further comprises a basic compound, such that a salt is formed between the basic compound and the acrylic and/or alkyd polymer.

5. The coating formulation according to claim 4, wherein the basic compound is selected as one from the group consisting of ammonia, triethyl amine, n,n-dimethyl ethanol amine, trimethyl amine, n-methyl morpholine, sodium hydroxide, potassium hydroxide, lithium hydroxide and a mixture thereof.

6. The coating formulation according to any of claims 1-5, wherein the alkyd-containing dispersion is produced by mechanical emulsification of the alkyd polymer or the alkyd-containing polymer in water with up to 10 weight % of surfactant(s), ionic emulsifiers, or a mixture thereof based on the alkyd polymer or the alkyd-containing polymer.

7. The coating formulation according to any of claims 1-6, wherein the silicone-acrylic-modified alkyd polymer comprises 0 to 75 weight % of one or more fatty acids, 0 to 75 weight % of one or more oil, 10 to 30 weight % of a polyol with two or more hydroxyl functional groups, 10 to 35 weight % of an aromatic polyacid with two or more carboxylic acid groups, and 0 to 30% weight % of benzoic acid.

8. The coating formulation according to any of claims 1-7, wherein the coating formulation further comprises further comprises one or more additives selected from the group of additional polymers, pigments or colorants, fillers, coalescent agents, pH neutralizing agents, plasticizers, defoamers, thickeners, biocides, co-solvents, rheology modifiers, wetting or spreading agents, leveling agents, conductive additives, adhesion promoters, anti-blocking agents, anti-cratering agents or anti-crawling agents, antifreezing agents, corrosion inhibitors, anti-static agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellants, and stain resistant agents.

9. An alkyd-containing dispersion for use in the waterborne coating composition, the alkyd-containing dispersion comprising water and an alkyd-containing polymer selected as one from the group of an acrylic-modified alkyd polymer, a silicone-acrylic-modified alkyd polymer, and a mixture thereof.

10. The dispersion according to claim 9, wherein the silicone-acrylic-modified alkyd polymer comprises about 2 to about 50% by weight of a silicone compound, about 5 to about 60% by weight of an alkyd polymer, and about 3 to about 50% by weight of an acrylic polymer.
wherein the silicone compound is a polysiloxane that contains one or more hydroxy-functional groups, alkoxy-functional groups, or a mixture thereof.

11. A coating layer formed on a substrate by the application of the waterborne coating formulation of any of claims 1-11, the coating layer comprising;
about 3 to about 95% by weight of one or more thermal insulating fillers; and
about 5 to about 97% by weight of an alkyd polymer, an acrylic-modified alkyd polymer, a silicone-acrylic-modified alkyd polymer, or a mixture thereof;
wherein the coating layer is uncured, partially cured, or substantially cured.

12. The coating according to claim 11, wherein the thermal insulating filler is selected as one from the group of silica aerogel, hollow glass microsphere, hollow ceramic spheres, ceramic particles, and mixtures thereof.

13. The coating according to any of claim 11 or 12, wherein the silicone-acrylic-modified alkyd polymer comprises about 2 to about 50% by weight of a silicone compound, about 5 to about 60% by weight of an alkyd polymer, and about 3 to about 50% by weight of an acrylic polymer.
wherein the silicone compound is a polysiloxane that contains one or more hydroxy-functional groups, alkoxy-functional groups, or a mixture thereof.

14. The coating according to any of claims 11-13, wherein the coating exhibits at least one of the following properties: a thermal conductivity that is less than 100 mW/mK; a weight retention of at least 70% after being exposed up to a temperature of 400° C. as measured by thermogravimetric analysis (TGA) with a heating rate of 20° C./min; or a weight loss of less than 50% up to a temperature of 470° C. as measured by the TGA.

15. The coating according to any of claims 11-14, wherein the substrate upon which the coating layer is formed comprises one selected from the group natural wood, fabricated wood, paper, cardboard, textiles, synthetic resins, plastics, ceramics, ferrous metals, non-ferrous metals, stone, concrete, and plaster.

The following specific examples are given to illustrate the alkyd polymer or alkyd-containing polymer dispersions of the present disclosure, as well as the coatings formed therefrom and methods of preparing the same, and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Experiment 1—Alkyd Polymer Synthesis

A total of 99 grams of mono-pentaerythritol, 179 grams of trimethyolpropane, 410 grams of linoleic acid (Pamolyn® 200, Eastman Chemicals, Kingsport, TN), 187 grams of isophthalic acid, and 170 grams of benzoic acid were charged into a reaction flask equipped with a receiver, cold water condenser, and nitrogen blanket. Methyl amyl ketone was also added into the reaction flask to facilitate the removal of water and clean the sublimed raw materials inside flask. The temperature of the reaction flask was raised to 220° C. The formed water was continuously removed from a flask. The progress of the polymerization was monitored by the acid value and viscosity. The resulting base alkyd polymer was found to exhibit Gardner-Holt viscosity of "M" and the acid value of 2.7 at 80 NVM in methyl amyl ketone solvent.

Experiment 2 Alkyd Polymer Synthesis

A total of 198 grams of mono-pentaerythritol, 358 grams of trimethyolpropane, 820 grams of linoleic acid (Pamolyn® 200, Eastman Chemicals, Kingsport, TN), 374 grams of isophthalic acid, and 340 grams of benzoic acid were charged into a reaction flask equipped with receiver, cold water condenser, and nitrogen blanket. Methyl amyl ketone was also added into the reaction flask to facilitate the removal of water and clean the sublimed raw materials inside flask. The temperature was raised to 230° C. The formed water was continuously removed from a flask. The progress of the polymerization was monitored by the acid value and viscosity. The resulting base alkyd polymer was found to exhibit Gardner-Holt viscosity of "1-" and the acid value of 7.7 at 80 NVM in methyl amyl ketone solvent.

Experiment 3 Silicone-Acrylic-Modified Alkyd Dispersion Produced by Radical Polymerization of Ethylenically Unsaturated Vinyl or (Meth)Acrylate Monomers in the Presence of Silicone-Modified Alkyd Produced with Unsaturated Fatty Acid(s)

A total of 150 grams of the product of EXPERIMENT 1 and 155 grams of hydroxyl functional phenyl-propyl polysiloxane (Z 6018, Dow Corning, Midland, MI) were charged into a reaction flask equipped with receiver, cold water condenser, and nitrogen blanket. The temperature was raised and maintained at 140° C. for about 3 hours before 30 grams of propoxy propanol was added to the flask. A mixture of 21 grams of para-methyl styrene, 11 grams of methyl methacrylate, 29 grams of n-butylacrylate, 23 grams of acrylic acid, and 5.5 grams of di-t-amyl peroxide was fed into the reaction flask at 140° C. over a period of about 3.5 hours. The temperature was cooled below 100° C. after holding for about 1.5 hours after the addition of the above monomer mixture was completed. The mixture of 21 grams of 28% ammonium hydroxide and 550 grams of de-ionized water was added with moderate agitation. The resulting silicone and acrylic-modified alkyd dispersion has non-volatile solids of 39.0%, pH value of 9.64, and viscosity of 100 centipoise at 25° C.

Experiment 4 Silicone-Acrylic-Modified Alkyd Dispersion Produced by Radical Polymerization of Ethylenically Unsaturated Vinyl or (Meth)Acrylate Monomers in the Presence of Silicone-Modified Alkyd Produced with Unsaturated Fatty Acid(s)

A total of 750 grams of the product of EXPERIMENT 2 and 165 grams of hydroxyl functional phenyl-propyl polysiloxane (Z 6018, Dow Corning, Midland, MI) were charged into a reaction flask equipped with receiver, cold water condenser, and nitrogen blanket. The temperature was raised and maintained at 140° C. for about 3 hours before 90 grams of propoxy propanol was added to the flask. A mixture of 60 grams of para-methyl styrene, 48 grams of methyl methacrylate, 72 grams of n-butyl acrylate, 69 grams of acrylic acid, and 16.5 grams of di-t-amyl peroxide was fed into the flask at 140° C. over a period of about 1.5 hours. The temperature was cooled below 100° C. after holding for about 1.5 hours after the addition of the above monomer mixture was completed. The mixture of 54 grams of 28% ammonium hydroxide and 1650 grams of de-ionized water was added into the flask with moderate agitation. The resulting silicone-acrylic-modified alkyd dispersion has non-volatile solids of 38.4%, pH value of 8.76, and viscosity of 3300 centipoise at 25° C.

Experiment 5 Alkyd Polymer Synthesis

A total of 122 grams of mono-pentaerythritol, 110 grams of trimethyolpropane, 102 grams of hydrogenated bisphenol A, 305 grams of soybean oil fatty acid, 72 grams of dehydrated castor oil fatty acid, 210 grams of isophthalic acid, and 56 grams of benzoic acid were charged into a reaction flask equipped with a receiver, cold water condenser, and nitrogen blanket. Methyl amyl ketone was also added into the flask to facilitate the removal of water and clean the sublimed raw materials inside flask. The temperature was raised to 230° C. The formed water was continuously removed from the flask. The progress of the polymerization was monitored by the acid value and viscosity. The resulting base alkyd polymer has Gardner-Holt viscosity of "Z2-" and acid value of 5.2 at 85 NVM in methyl amyl ketone solvent.

Experiment 6 Acrylic Polymer-Modified Fatty Acid(s)

A mixture of 1378 grams of of linoleic acid (Pamolyn® 200, Eastman Chemicals, Kingsport, TN) and 697 grams of dehydrated castor oil fatty acid was added to a reaction flask equipped with a nitrogen blanket. The temperature was raised to 160° C. The mixture of 771 grams of styrene, 607 grams of isobutyl methacrylate, 492 grams of methacrylic acid, and 54 grams of di-t-butyl peroxide was added to the flask over about 4 hours while the temperature was maintained at 160° C. The reaction was held for about 40 minutes before the mixture of 1.0 gram of di-t-butyl peroxide and 1.0 gram of methyl amyl ketone was added into a flask. After holding at 160° C. for 1 hour, the temperature was cooled.

The resulting product has a Gardner-Holt viscosity of "U-W" at 80NVM in methyl amyl ketone.

Experiment 7 Silicone and Acrylic-Modified Alkyd Dispersion Produced by the Reaction of a Silicone-Modified Alkyd with Acrylic Polymer-Modified Fatty Acid(s)

A total of 120 grams of the product of EXPERIMENT 5 and 80 grams of hydroxyl functional phenyl-propyl polysiloxane (Z 6018, Dow Corning, Midland, MI) were charged into a reaction flask equipped with a receiver, cold water condenser, and nitrogen blanket. The temperature was raised and maintained at 160° C. for about 2.5 hours before 200 grams of the product of EXPERIMENT 6 was added to a flask. The temperature was raised to 205° C. and held for about 4 hours before a mixture of 20 grams of 28% ammonium hydroxide and 520 grams of de-ionized water was charged into the flask. The temperature was lowered to 65° C., when 6 grams of a monomeric cycloaliphtic diisocyanate (DESMODUR® W, Covestro, Pittsburgh, PA) was added into a flask with moderate agitation. The temperature was raised to 85° C. and held for about 1.5 hours before the batch was cooled. The resulting silicone-acrylic-modified alkyd dispersion has the nonvolatile solids of 42.0%, pH value of 8.35 and viscosity of 300 centipoise at 25° C.

Experiment 8 Paint Preparation with Alkyd-Containing or Alkyd Polymer

The following paint formula was adopted to prepare the thermal insulting coating for the current invention.

|  | Pounds | Gallons |
| --- | --- | --- |
| Alkyd Dispersion (39% NVM) | 64.5 | 7.5 |
| Water | 12.9 | 1.5 |
| Non-ionic surfactant | 1.6 | 0.2 |
| (Triton ™ CF-10, Dow Chemical Co., Midland, MI) | | |
| Ammonium Hydroxide 28% | 1.6 | 0.2 |
| Copolymer dispersant | 2.6 | 0.3 |
| (Tamol1 ™ 65, Dow Chemical Co., Midland, MI) | | |
| Silicone defoamer | 1.3 | 0.1 |
| (BYK-022, Altana Group, Germany) | | |
| Titanium dioxide slurry | 32.2 | 2.1 |
| (Ti-Pure R-746, Chemours Co., Wilmington, DE) | | |
| Mix 15 min | | |
| Alkyd Dispersion (39% NVM) | 255.3 | 29.6 |
| Metal-based catalyst | 2.6 | 0.3 |
| (Oxy-Coat 1101, OMG Borchers, Germany) | | |
| Mixed metal drier | 0.7 | 0.1 |
| (Dricat 507, Dura Chemicals, Emeryville, CA) | | |
| Mix 15 min then add | | |
| Silica aerogel | 37.4 | 33.2 |
| (Enova Aerogel IC-3100, Cabot Corp., Boston, MA) | | |
| Mix 15 min at 1000 RPM | | |
| Water | 206.4 | 24.7 |
| Silicone defoamer | 0.7 | 0.1 |
| (BYK-022, Altana Group, Germany) | | |
| TOTAL | 619.8 | 100.0 |
| PVC % | 74.0 | |
| NVM % | 30.1 | |
| Volume Solids % | 47.0 | |
| VOC (g/L) | 0.5 | |

Using a Cowles type high speed disperser, a dispersion vessel was charged with 64.5 lbs of alkyd dispersion 39% NVM. Under mild agitation, the water, Triton CF-I0 surfactant, ammonium hydroxide, dispersant (Tamol165), Defoamer (BYK-022) and the titanium dioxide-slurry (Ti-Pure R-746) was added. This mixture was subjected to high speed dispersion for 15 minutes. The speed of the mixer was then reduced to medium speed and the remaining alkyd dispersion 39% NVM (255.3 lbs) was added followed by the Oxycoat and Dricat driers. The mixture was then mixed for 15 minutes at medium speed. The Aerogel was then slowly added to keep the low density aerogel from dusting and floating out of the vessel. During the Aerogel addition step the viscosity of the mixture increased. If the viscosity reached a point where uniform flow was inhibited a portion of the remaining 206.4 lbs of water was added to maintain fluidity and uniform mixing. Once all the Aerogel was added, the mixture was mixed for an additional 15 minutes at 1000 RPM. The the remaining water and the defoamer (BYK-024) was added and the mixture was thoroughly mixed to finish.

Experiment 9 Paint Preparation of Control Containing Latex Polymer

The following paint formula was adopted to prepare the thermal insulting coating for the control thermal insulating coating containing latex polymer.

|  | Pounds | Gallons |
|---|---|---|
| Latex Polymer | 339.2 | 39.4 |
| (ENCOR DM 109, Arkema Inc, King of Prussia, PA) | | |
| Non-ionic surfactant | 2.6 | 0.3 |
| (Triton ™ CF-10, Dow Chemical Co., Midland, MI) | | |
| Ammonia 28% | 2.6 | 0.3 |
| Latex dispersant | 4.1 | 0.5 |
| (Tamol1 ™ 165, Dow Chemical Co., Midland, MI) | | |
| Silicone defoamer | 2.0 | 0.2 |
| (BYK-022, Altana Group, Germany) | | |
| Titanium dioxide slurry | 51.2 | 2.6 |
| (Ti-Pure R-746, Chemours Co., Wilmington, DE) | | |
| Mix 15 min then add | | |
| Glycol ether | 25.6 | 3.4 |
| (Dowanol ™ DPnB, Dow Chemical, Midland, MI) | | |
| Silica aerogel | 59.4 | 52.8 |
| (Enova Aerogel IC-3100, Cabot Corp., Boston, MA) | | |
| Mix 15 min at 1000 RPM | | |
| Associative polyurethane thickener (Coapur ™ 6050, | 3.1 | 0.3 |
| Coatex Inc., Chester, SC) | | |
| Silicone defoamer | 0.5 | 0.1 |
| (BYK-024, Altana Group, Germany) | | |
| TOTAL | 490.4 | 100.0 |
| PVC % | 74.8 | |
| NVM % | 54.0 | |
| Volume solids % | 71.0 | |
| VOC (g/L) | 44.0 | |

Using a Cowles type high speed disperser, a dispersion vessel was charged with 339.2 lbs of latex polymer (ENCOR® DM 109). Under mild agitation the water, Triton CF-10 surfactant, ammonium hydroxide, dispersant (Tamol165), Defoamer (BYK-022) and the titanium dioxide slurry (Ti-Pure R-746) was added. The mixture was subjected to high speed dispersion for 15 minutes. The speed of the mixer was then reduced to medium speed and the coalescing solvent (Glycol Ether DPnB) was added. The mixture was mixed for 15 minutes at medium speed. The Aerogel was slowly added to keep the low density aerogel from dusting and floating out of the vessel. After the addition of all the Aerogel, the mixture was mixed 15 minutes at 1000 RPM. To complete the coating formulation a rheology modifier (Coapur 6050) and Defoamer (BYK-024) was slowly added the resulting mixture as thoroughly mixed to finish.

Experiment 10—Thermal Conductivity Testing

Figure 1:
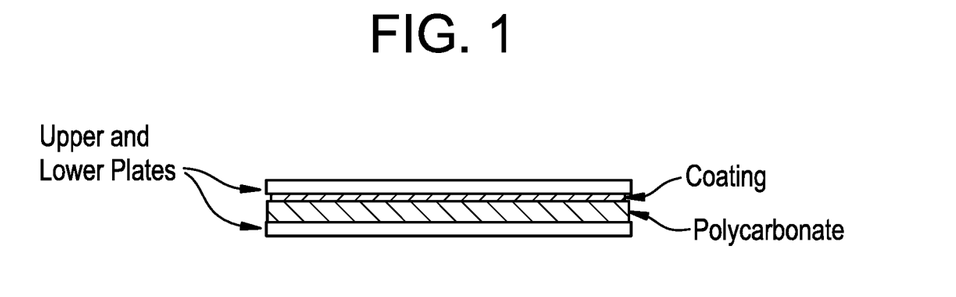
FIG. 1 is a schematic representation of the Laser Test Set-up used to measure thermal conductivity of the thermal insulating coating formed according to the teachings of the present disclosure.
Figure 2:
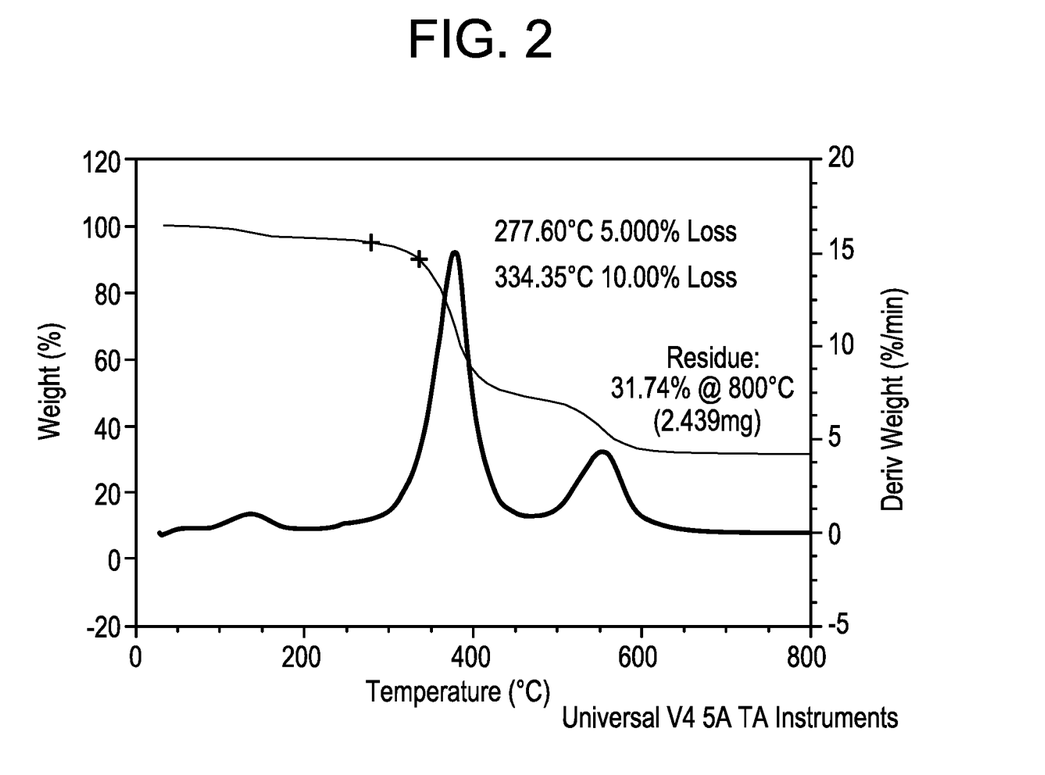
FIG. 2 is a plot of weight (%) and derivative weight loss (%/min) plotted as a function of temperature as measured in a thermogravimetric analysis (TGA) of a thermal insulating coating based on a latex product (ENCOR® DM 166)
Figure 3:
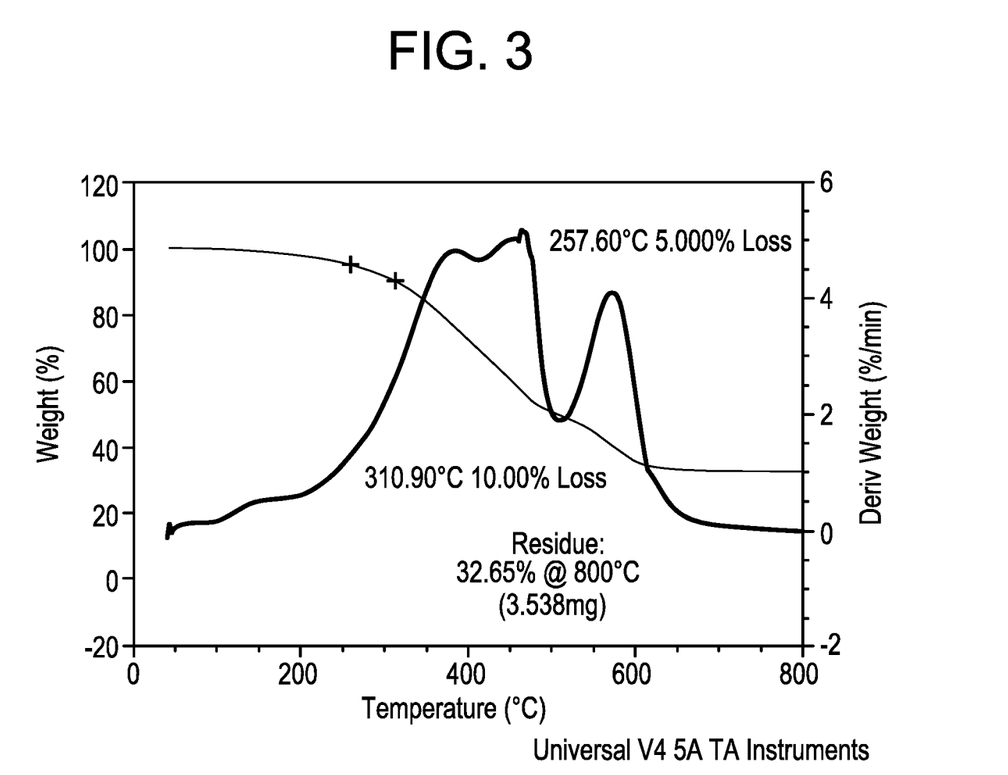
FIG. 3 is a plot of weight (%) and derivative weight loss (%/min) plotted as a function of temperature as measured in a TGA of a thermal insulating coating based on an acrylic modified alkyd dispersion (SYNAQUA® 821-1377)
Figure 4:
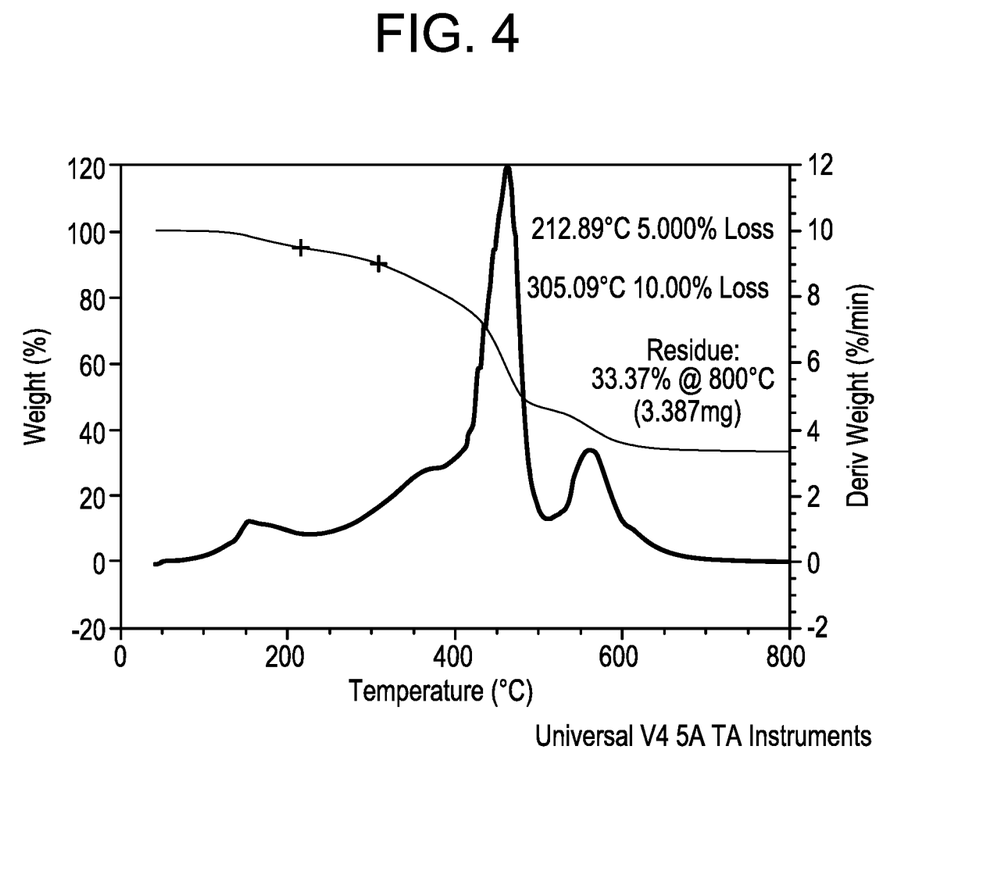
FIG. 4 is a plot of weight (%) and derivative weight loss (%/min) plotted as a function of temperature as measured in a TGA of a thermal insulating coating based on an acrylic modified alkyd dispersion (prototype EX80-801)
Figure 5:
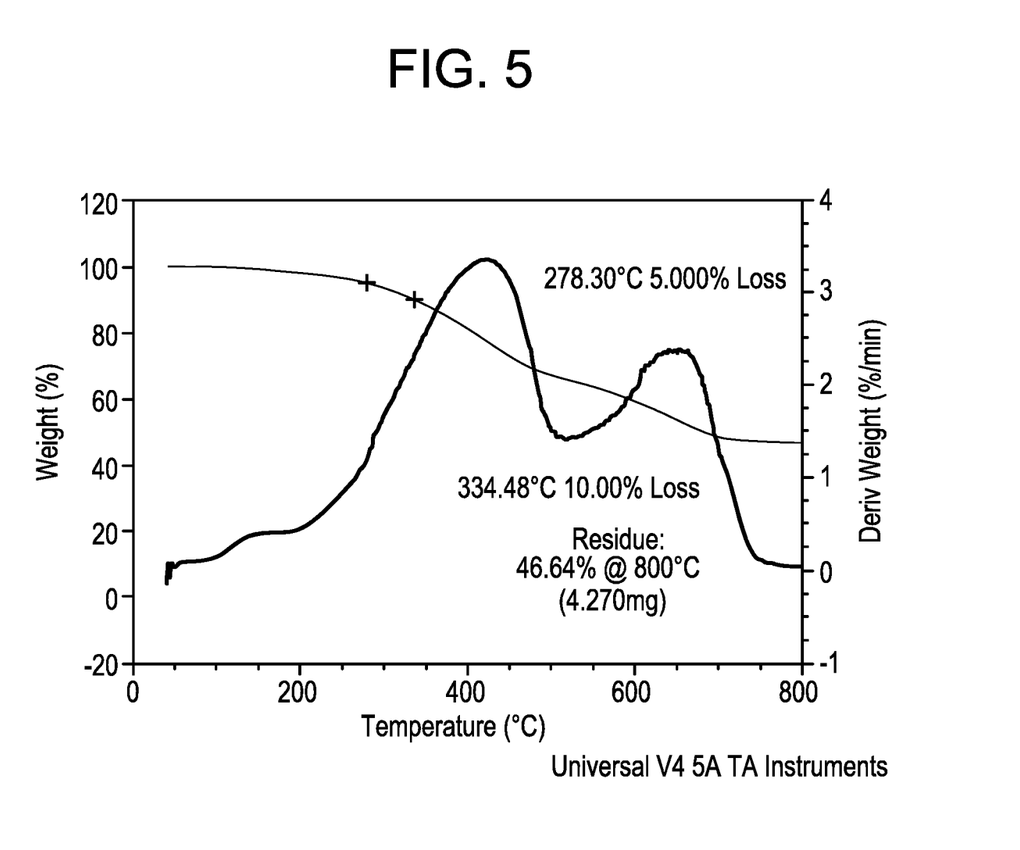
FIG. 5 is a plot of weight (%) and derivative weight loss (%/min) plotted as a function of temperature as measured in a TGA of a thermal insulating coating based on an acrylic and silicone modified alkyd dispersion from Experiment 3.
Figure 6:
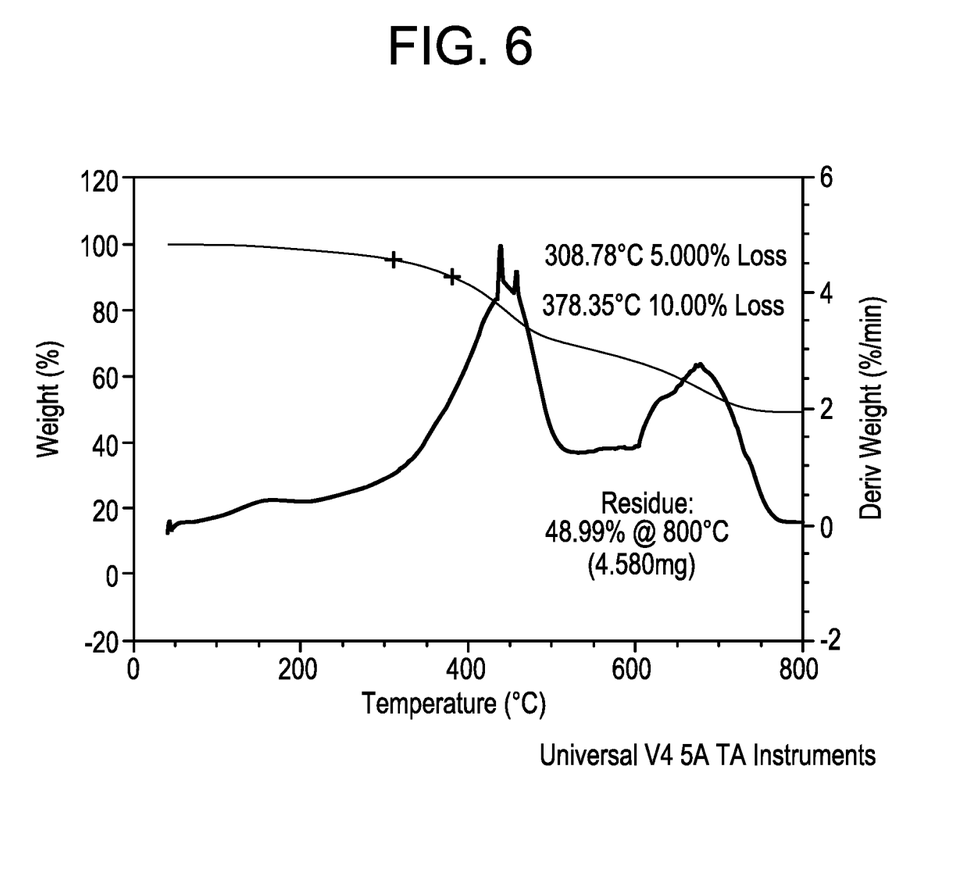
FIG. 6 is a plot of weight (%) and derivative weight loss (%/min) plotted as a function of temperature as measured in a TGA of a thermal insulating coating based on an acrylic and silicone modified alkyd dispersion from Experiment 4.

Thermal conductivity measurements were performed using a Fox200HT heat flow meter available from LaserComp, Inc. The thermal conductivity is determined by measuring the sample thickness, heat flux and temperature difference across two plates within the heat flow meter as shown in FIG. 1. The two plates are 8 inches by 8 inches, and have a thickness of 0.5 inches.

A commercially available, water-borne acrylic modified alkyd dispersion (SYNAQUA® 821-1377, Arkema Inc.) is utilized to formulate a thermal insulating coating using silica aerogel (Enova™ Aerogel C3100, Cabot) as thermal insulating filler. Two styrene acrylic latex products, ENCOR® DM 166 and ENCOR® DM 109 (Arkema Inc.), are also used to prepare thermal insulating coatings. The thermal conductivity of each of the coatings is measured using the heat flow meter as shown below in Table 1.

TABLE 1

Thermal Conductivity Baseline Measurements.

|  | ENCOR® DM 166 | ENCOR® DM 109 | SYNAQUA® 821-1377 |
|---|---|---|---|
| Polymer Type | Acrylonitrile modified styrene acrylic latex | Acrylonitrile modified styrene acrylic latex | Acrylic modified alkyd dispersion |
| Thermal Conductivity (mW/mK) | 55-75 | 60 | 35-45 |

Surprisingly, the paint formulated with the acrylic modified alkyd dispersion (SYNAQUA® 821-1377) demonstrates substantially lower thermal conductivity than the paints formulated with the styrene acrylic latex products (ENCOR® DM 166 or ENCOR® DM 109). The lower thermal conductivity exhibited by the acrylic modified alkyd coating is believed to correlate with the coating exhibiting enhanced thermal insulating performance.

Experiment 11 Heat Stability Testing

Thermogravimetric analysis (TGA) was performed in air on the thermal insulating coatings described in Table 2 below after being air-dried for more than 1 week by heating to 800° C. with the heating rate of 20° C./min. The results of the TGA are described in the corresponding FIGS. 2-6.

TABLE 2

Description of Thermal Insulating Coatings Used in Thermogravimetric Analysis.

| FIG. | POLYMER BINDER | THERMAL INSULATING FILLER |
|---|---|---|
| 2 | Styrene acrylic latex (ENCOR® DM 166) | Silica aerogel (ENOVA™ Aerogel C3100) |
| 3 | Acrylic modified alkyd (SYNAQUA® 821-1377) | Silica aerogel (ENOVA™ Aerogel C3100) |
| 4 | Acrylic modified alkyd (prototype EX80-801) | Silica aerogel (ENOVA™ Aerogel C3100) |
| 5 | Acrylic and silicone modified alkyd (EXPERIMENT 3) | Silica aerogel (ENOVA™ Aerogel C3100) |
| 6 | Acrylic and silicone modified alkyd (EXPERIMENT4) | Silica aerogel (ENOVA™ Aerogel C3100) |

The heat stability for each coating was determined in the thermogravimetric analysis (TGA) by the weight retention of coating film when heated up to 400° C. and/or the temperature at which the coating film loses 50% of its original weight. The results are highlighted in both FIGS. 2-6, as well as summarized in Table 3 provided below.

TABLE 3

Summary of the Thermogravimetric Analysis (TGA) for Coatings of Table 2.

| Polymer Binder | The Weight Retention (%) of Coating Film at 400° C. | The Temperature (° C.) When the Coating Film Loses 50% of the Original Weight |
|---|---|---|
| FIG. 2 - Styrene acrylic latex (ENCOR ® DM 166) | 56 | 425 |
| FIG. 3 - Acrylic modified alkyd (SYNAQUA ® 821-1377) | 72 | 470 |
| FIG. 4 - Acrylic modified alkyd (prototype EX80-801) | 78 | 475 |
| FIG. 5 - Acrylic and silicone modified alkyd (EXPERIMENT 3) | 81 | 675 |
| FIG. 6 - Acrylic and silicone modified alkyd (EXPERIMENT4) | 87 | 725 |

The results of the thermogravimetric analysis (TGA) confirms that the acrylic-modified alkyds, and the silicone-acrylic-modified alkyd dispersions demonstrate much better heat stability than existing latex-based thermal insulating coatings. Alternatively, the silicone and acrylic-modified alkyd dispersions exhibit the highest degree of heat stability. The heat stability of thermal insulating coating is one of the most important properties to determine a coating service life when a coating is exposed to high temperatures for an extended period of time. The level of thermal insulation and heat stability exhibited by the alkyd polymer and alkyd-containing polymer dispersions of the present disclosure are not attainable by existing thermal insulating coatings.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A heat resistant, thermal insulating waterborne coating formulation, the coating formulation comprising about 5 to about 30% by weight of silica aerogel thermal insulating filler with the remainder being an alkyd-containing dispersion, the alkyd-containing dispersion comprising water and an alkyd polymer or an alkyd-containing polymer in the form of dispersed solid particles and selected as one from the group consisting of an acrylic-modified alkyd polymer, a silicone-acrylic-modified alkyd polymer, and a mixture thereof, such that the coating formulation contains about 30 to about 80% by weight of the water and about 2 to about 50% by weight of the alkyd-containing polymer.

2. The coating formulation according to claim 1, wherein the coating formulation further comprises a basic compound, such that a salt is formed between the basic compound and the acrylic-modified alkyd polymer, the silicone-acrylic-modified polymer and/or the mixture thereof.

3. The coating formulation according to claim 2, wherein the basic compound is selected as one from the group consisting of ammonia, triethyl amine, n, n-dimethyl ethanol amine, trimethyl amine, n-methyl morpholine, sodium hydroxide, potassium hydroxide, lithium hydroxide and a mixture thereof.

4. The coating formulation according to claim 1, wherein the alkyd-containing dispersion is emulsified in water with up to 10 weight % of surfactant(s) based on the alkyd polymer or the alkyd-containing polymer.

5. The coating formulation according to claim 1, wherein the coating formulation further comprises a surfactant, an ionic emulsifier, or a mixture thereof.

6. The coating formulation according to claim 1, wherein the coating formulation further comprises one or more additives selected from the group of additional polymers, pigments or colorants, fillers, coalescent agents, pH neutralizing agents, plasticizers, defoamers, thickeners, biocides, co-solvents, rheology modifiers, wetting or spreading agents, leveling agents, conductive additives, adhesion promoters, anti-blocking agents, anti-cratering agents or anti-crawling agents, antifreezing agents, corrosion inhibitors, anti-static agents, flame retardants, optical brighteners, UV absorbers or other light stabilizers, chelating agents, cross-linking agents, flattening agents, flocculants, humectants, insecticides, lubricants, odorants, oils, waxes or anti-slip aids, soil repellants, and stain resistant agents.

7. The coating formulation according to claim 1, wherein the coating formulation contains volatile organic compounds (VOCs) in a quantity that is less than 150 grams/liter as determined by ASTM D2369-10(2015)e1 test method.

8. The coating formulation of claim 1 which, when applied to a substrate, exhibits at least one of the following properties: a thermal conductivity that is less than 100 mW/mK; a weight retention of at least 70% after being exposed to a temperature of 400° C. as measured by thermogravimetric analysis (TGA) with a heating rate of 20° C./min.; or a weight loss of less than 50% up to a temperature of 470° C. as measured by the TGA.

* * * * *